United States Patent
Vinogradov (10) Patent No.: US 7,729,061 B2
(45) Date of Patent: Jun. 1, 2010

(54) IMAGING SYSTEM HAVING ANAMORPHIC MAGNIFICATION

(75) Inventor: Igor Vinogradov, New York, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 80 days.

(21) Appl. No.: 12/112,354

(22) Filed: Apr. 30, 2008

(65) Prior Publication Data

US 2009/0272807 A1 Nov. 5, 2009

(51) Int. Cl.
*G02B 3/06* (2006.01)

(52) U.S. Cl. ........................................ 359/711; 359/668

(58) Field of Classification Search ................ 359/711, 359/708, 207.1, 668; 235/454
See application file for complete search history.

(56) References Cited

U.S. PATENT DOCUMENTS

| | | |
|---|---|---|
| 2,207,409 A | 7/1940 | Newcomer |
| 5,414,458 A | 5/1995 | Harris et al. |
| 5,491,349 A | 2/1996 | Komoto et al. |
| 6,912,300 B1 * | 6/2005 | Okamoto et al. ............ 382/127 |
| 2005/0154262 A1 | 7/2005 | Banik et al. |
| 2006/0109668 A1 | 5/2006 | Schmieder et al. |

OTHER PUBLICATIONS

International Search Report and the Written Opinion of the International Searching Authority for International Application PCT application PCT/US2002/40011, mailed May 28, 2009.

* cited by examiner

*Primary Examiner*—Joseph Martinez (57) ABSTRACT

A method and imaging system (10) is disclosed having a lens assembly (40) adapted for reading a target object (18) comprising an anamorphic lens assembly with first (L3) and second (L4) toroidal lenses adapted for positioning between a target object (18) and a sensor array (32) of an imaging system (10) such that an image received from the target object (18) is anamorphically magnified before impinging onto the sensor array along first and second directions by the anamorphic lens assembly (L3, L4). The anamorphic magnification in the first direction differs from the magnification in the second direction such that the image of the target object (18) projected onto the sensor array (32) appears elongated along the first direction relative to the second direction.

22 Claims, 8 Drawing Sheets

IMAGING SYSTEM HAVING ANAMORPHIC MAGNIFICATION

TECHNICAL FIELD

The present invention relates to an imaging system employing anamorphic magnification, and more particularly, an imaging system that optimizes and enhances the resolution of a sensor array within the imaging system by improving the resolution therein along a preferred direction.

BACKGROUND

Various electro-optical systems have been developed for reading optical indicia, such as barcodes. A barcode is a coded pattern of graphical indicia comprised of a series of bars and spaces of varying widths, the bars and spaces having differing light reflecting characteristics. Some of the more popular bar code symbologies include: Uniform Product Code (UPC), typically used in retail stores sales; Code 39, primarily used in inventory tracking; and Postnet, which is used for encoding zip codes for U.S. mail. Systems that read and decode bar codes employing charged coupled device (CCD) or complementary metal oxide semiconductor (CMOS) based imaging systems are typically referred to hereinafter as imaging systems, imaging-based bar code readers, imaging readers, or barcode scanners.

Imaging systems electro-optically transform the graphic indicia into electrical signals, which are decoded into alphanumerical characters that are intended to be descriptive of the article or some characteristic thereof. The characters are then typically represented in digital form and utilized as an input to a data processing system for various end-user applications such as point-of-sale processing, inventory control, and the like.

Imaging-based bar code reader systems that include CCD, CMOS, or other imaging configurations comprise a plurality of photosensitive elements (photosensors) or pixels typically aligned in an array pattern that could include a number of arrays. The imaging-based bar code reader systems typically employ light emitting diodes (LEDs) or other light sources for illuminating a target object, e.g., a target bar code. Light reflected from the target bar code is typically focused through a lens of the imaging system onto the photosensitive array. As a result, the focusing lens projects an image of an object of interest within the field-of-view (FOV) onto the pixel array. Periodically, the pixels of the array are sequentially read out, creating an analog signal representative of a captured image frame. The analog signal is amplified by a gain factor, by for example an operational amplifier or microprocessor. The amplified analog signal is digitized by an analog-to-digital converter. Decoding circuitry of the imaging system processes the digitized signals representative of the captured image frame and attempts to decode the imaged bar code.

SUMMARY

One example embodiment of the present disclosure includes an imaging system having a lens assembly adapted for imaging a target object. The lens assembly comprises a base imaging lens assembly for providing optical power to project an image of an object of interest onto a photosensitive array of an imaging system. The lens assembly further comprises an anamorphic lens assembly comprising first and second toroidal lenses adapted for positioning between the base imaging lens assembly and a sensor array of an imaging system such that the projected image from the base imaging lens assembly is anamorphically magnified before impinging onto the sensor array along first and second directions. The anamorphic magnification in the first direction differs from the magnification in the second direction. An image of the object of interest project onto the photosensitive array appears noticeably elongated along the first direction relatively to the second direction or vise versa.

Another example embodiment of the present disclosure includes a method for enhancing the resolution of an image projected upon a sensor array in an imaging system. The steps comprise providing a scanning arrangement having a sensor array for receiving an image projected by a base imaging lens assembly with a positive optical power from an object of interest with said base imaging lens assembly toward the sensor array. The method further comprises modifying the optical power from the base imaging lens assembly with at least one toroidal lens toward the sensor array and modifying the optical power with anamorphic magnification generated by the at least one toroidal lens so that the optical power along a first direction projected onto the sensor array differs from the optical power along a second direction projected onto the sensor array.

A further example embodiment of the present disclosure includes a method for enhancing the resolution of an image projected upon a sensor array in an imaging system. The method comprises the steps of providing a scanning means having a sensor array for receiving an image reflected from a target object and producing optical power to project the image of the target object with at least one base imaging lens toward the sensor array. The method further comprises modifying the optical power from the base imaging lens with at least one light transmitting means toward the sensor array. The modifying the optical power comprises providing anamorphic magnification from the light transmitting means so that the optical power along a first direction projected onto the sensor array differs from the optical power along a second direction projected onto the sensor array.

Yet a further example embodiment of the present disclosure includes an imaging system for imaging and decoding a target barcode located on an object of interest comprising a scanning arrangement having a photosensitive array for receiving an image reflected from an object of interest and a lens assembly for modifying the projected image prior to its impingement upon the photosensitive array. The lens assembly comprises a base imaging lens assembly having first and second spherical lenses for providing optical power for the base imaging lens. The first spherical lens is positioned in the imaging system between the target object and the second spherical lens. The lens assembly further comprises an anamorphic lens assembly comprising first and second toroidal lenses adapted for positioning between the second spherical lens and the sensor array of the imaging system such that the projected image received from the base imaging lens assembly is anamorphically magnified toward the sensor array along first and second directions, the anamorphic magnification in the first direction differs approximately 1.5 to 3.0 times from the anamorphic magnification in the second direction.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, wherein like reference numerals refer to like parts throughout the drawings and in which.

DETAILED DESCRIPTION

The present invention relates to an imaging system 10 employing a lens assembly with anamorphic magnification. The imaging system 10 optimizes and enhances the resolution of a sensor array located within the imaging system by improving the resolution therein along a preferred direction.

Figure 1:
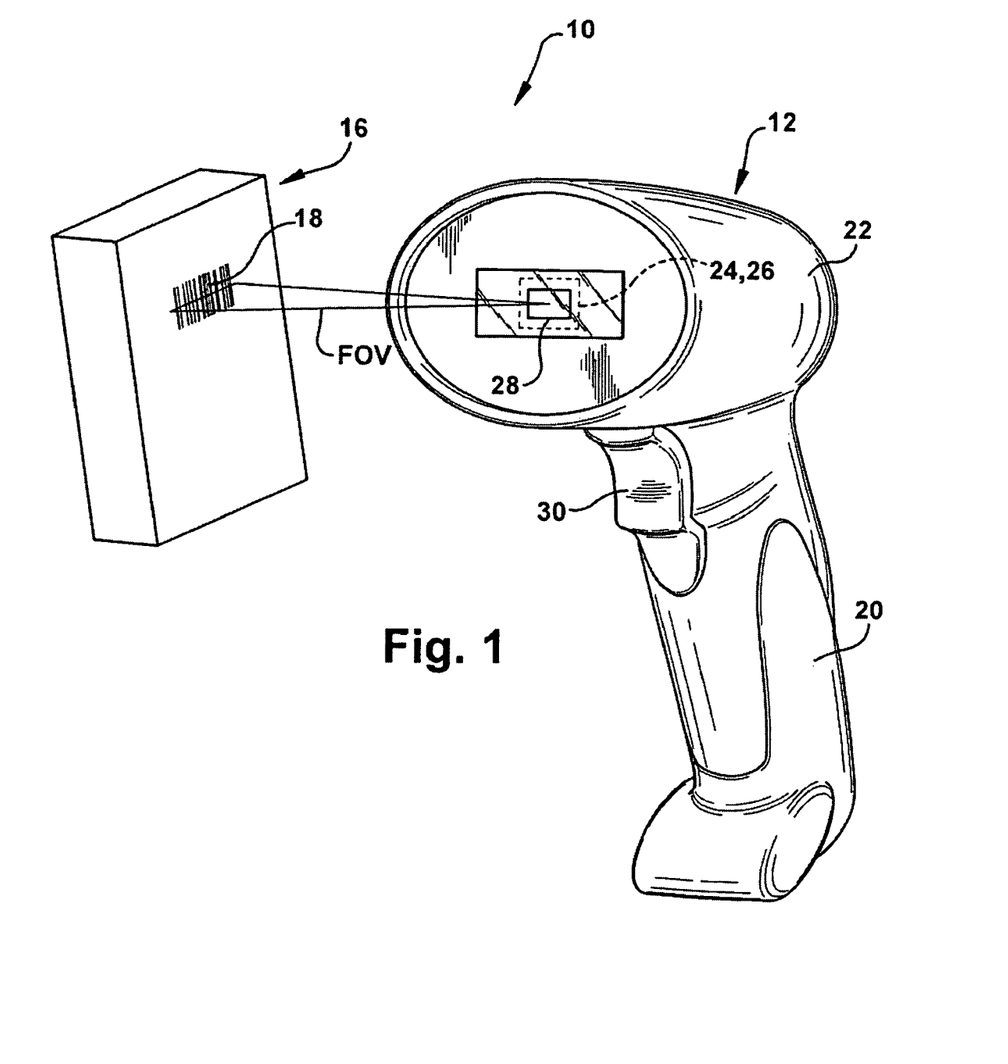
FIG. 1 is a perspective view of a portable imaging reader constructed in accordance with one embodiment of the disclosure, imaging a target object located on a product or product's packaging.
Figure 2:
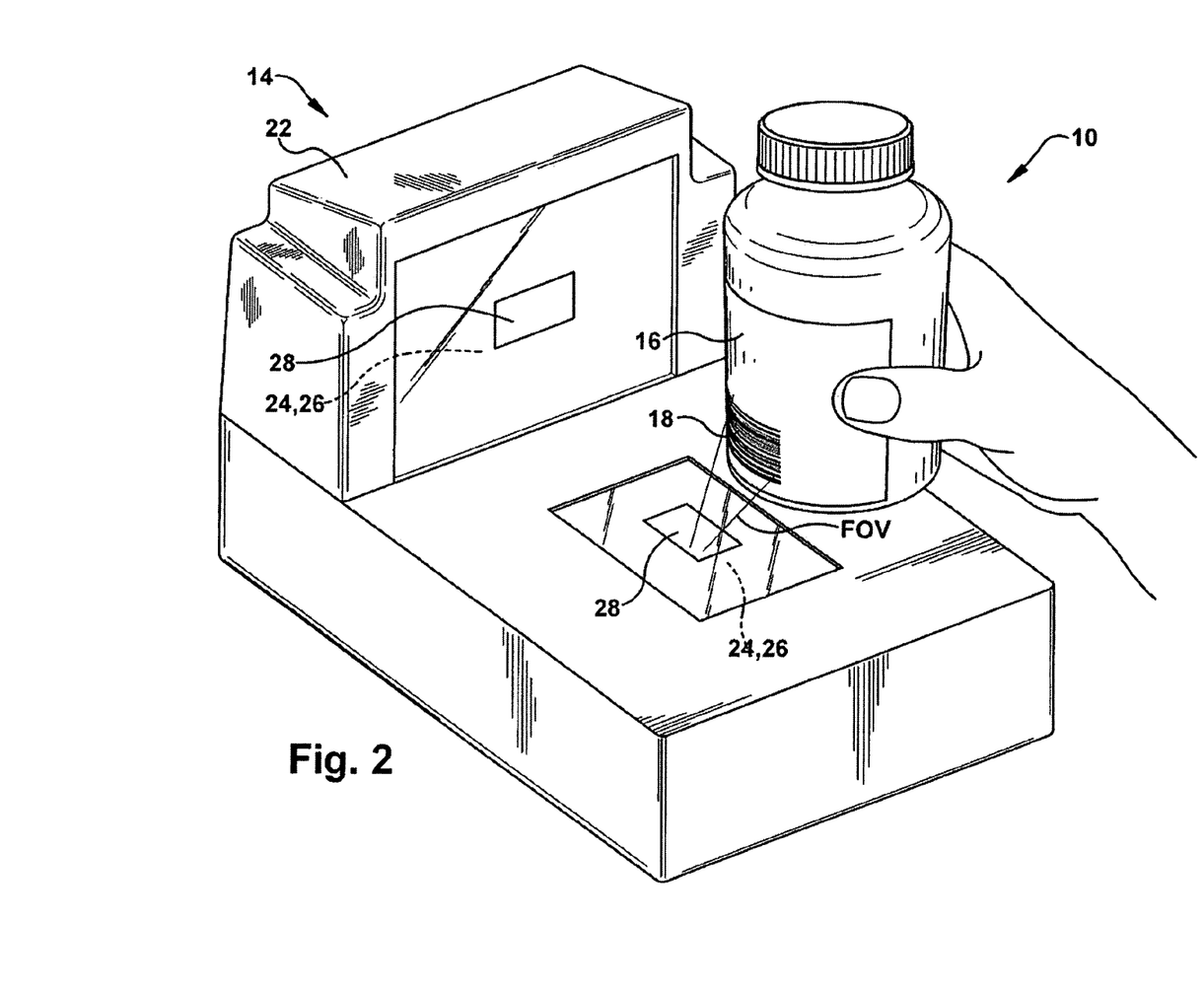
FIG. 2 is a perspective view of a presentation-type imaging reader constructed in accordance with another embodiment of the disclosure, imaging a target object located on a product or product's packaging.

In one example embodiment of the present disclosure, the imaging system 10 is a portable imaging reader 12 employing anamorphic magnification, as illustrated in FIG. 1. In yet another example embodiment of the present disclosure, the imaging system 10 is a bi-optic or presentation-type imager 14 having anamorphic magnification, as illustrated in FIG. 2.

The portable imaging reader 12 employs an internal power source such as a battery, but could just as easily be a reader having a wire connection from which power is supplied, or remotely powered through an induction system without departing from the spirit and scope of the claimed invention. In addition to imaging and decoding 1D and 2D barcodes, the imaging systems 10 are also capable of capturing soft and hard images, signature imaging acquisition and identification systems, optical character recognition systems, fingerprint identification systems, and the like.

Referring again to FIG. 1, the portable imaging reader 12 is imaging an item of interest 16 such as a generic product having a target object 18 in any known readable form of indicia, including barcodes, signature patterns, soft barcodes, and the like. The portable imaging reader 12 includes a handle 20, adapted for gripping by an operator during use. The imaging reader 12 further comprises a housing 22 that supports a lens assembly 24 and scanning arrangement 26 therein. The lens assembly 24 focuses a field-of-view (FOV) into a camera 28 located within the scanning arrangement 26.

In the illustrated embodiment, the camera's field-of-view (FOV) is enabled for imaging the target object 18 when the operator engages a trigger 30 located on the handle 20. However, it is noted that in another example embodiment, the imaging reader 12 is automatically enabled without the need of operator intervention or activation of a trigger.

The presentation-type imager 14 of FIG. 2 further comprises a housing 22 that supports a lens assembly 24 and scanning arrangement 26 therein. The lens assembly 24 projects objects within the field-of-view (FOV) onto a camera 28 having a photosensitive array located within the scanning arrangement 26. In the illustrated embodiment of FIG. 2, the presentation type imager 14 comprises both vertical and horizontal scanning arrangements 26.

Figure 3:
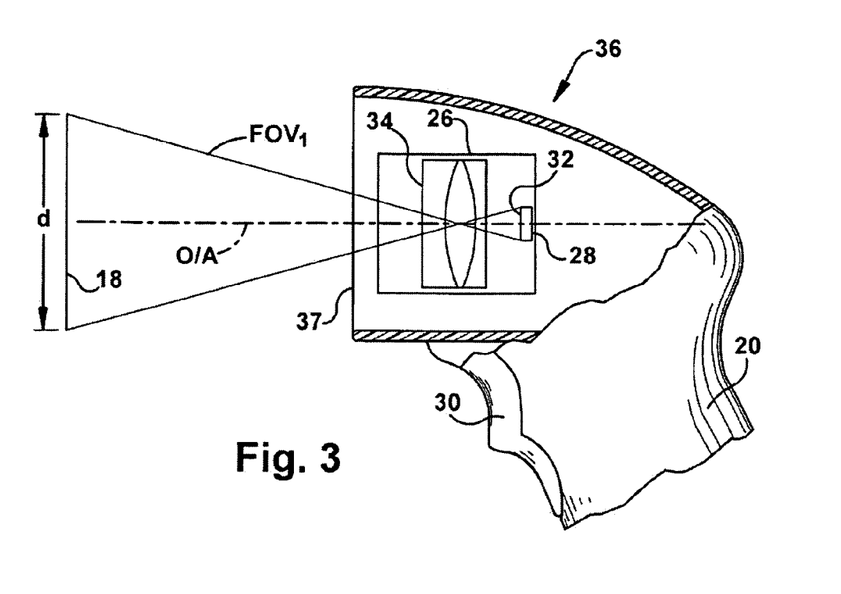
FIG. 3 is a partial-sectional-side view of a portable imaging reader imaging a target object in which the image plane is substantially normal to an optical axis of the portable imaging reader.
Figure 4:
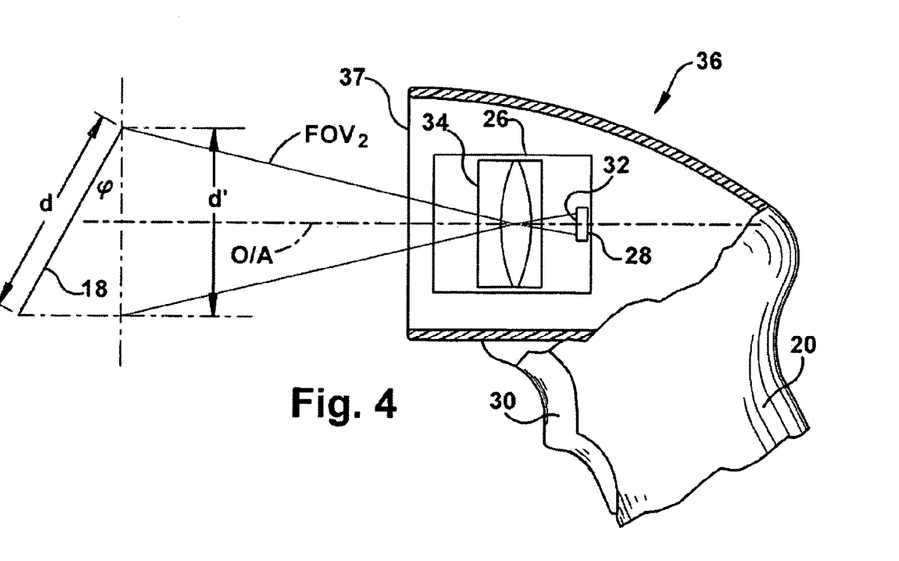
FIG. 4 is a partial-sectional-side view of a portable imaging reader imaging a target object in which the image plane is at an angle other than normal to an optical axis of the portable imaging reader, reducing the resolution received by the imaging sensor located therein.

The scanning arrangement 26, including the camera 28 comprises a scan engine, such as a CCD or CMOS imaging configuration. The scan engine's imaging configuration typically comprises a plurality of photosensitive elements (photosensors) or pixels typically aligned in an array pattern that could include a number of arrays, (hereinafter photosensor, photosensitive array, or sensor array 32), as best seen in FIGS. 3-7. In FIGS. 3 and 4, light reflected from the target object 18 is projected by a focusing assembly onto the sensor array 32. The light reflected from the target object 18 onto the sensor array 32 can include ambient light, or alternatively, enhanced lighting from an illumination source (not shown) such as a light emitting diode (LED) or bank of LEDs operable with the imaging reader 12. However, it should be noted that other known artificial light sources can equally be used.

The focusing assembly 34 generates an image from its field-of-view that is projected onto the sensor array 32. Periodically, the pixels of the sensor array 32 of the camera 28 are sequentially read-out, creating an analog signal representative of a captured image frame. The analog signal is amplified by a gain factor, by for example, an operational amplifier or microprocessor that can be either internal or external to the scanning arrangement 26. The amplified analog signal is digitized by an analog-to-digital ("A/D") converter. Decoding circuitry and the A/D converter can also be internal or external to the scanning arrangement 26 and accordingly process the digitized signals representative of the captured image frame and attempts to decode the target object 18.

Referring again to FIGS. 3 and 4 are partial-sectional side views, of a portable imaging reader 36. In FIG. 3, the portable imaging reader 36 is imaging a target object in which the image plane (d) is substantially normal to an optical axis (O/A) of the portable imaging reader. As a result, the imaging reader's field-of-view ($FOV_1$) covers the entire target object, utilizing substantially the entire sensor array 32 in the camera 28 as illustrated by the ray tracings in FIG. 3.

In the instances illustrated in FIG. 3, it is desirable to have the FOV large at the near distance of the exit window 37 of the scanner so that the FOV covers the entire target object 18. However, in many scanning and imaging applications, for example, bi-optic (FIG. 2), presentation scanning, and non-normal scanning (illustrated in FIG. 4), the image resolution on the sensor array 32 is reduced because the target object 18 is read at a substantial angle represented by psi ($\psi$) (the image plane (d) being at some angle other than normal to the optical axis (O/A) of the imaging reader or "Field Angle"). Stated another way, the reduced resolution of the imaged target object 18 will appear as a different size on the sensor array 32 if imaged on axis versus at the edge of the field. This reduced resolution is best explained in conjunction with FIG. 4 in which the image plane (d) is reduced to (d') by the cosine of the angle psi ($\psi$), as shown by the reduced image projected on the sensor array 32 (when compared with FIG. 3) by the amount illustrated by Equation 1.

$$d' = d * \cos(\psi) \qquad \text{Equation (1)}$$

This reduced resolution is problematic when trying to image high-density target objects, such as high-density barcodes. The relative size of the object within the FOV changes as a cosine of psi ($\psi$), which causes the object to appear smaller within a given FOV.

In general, the working range or ability to image target objects 18 is limited by the imaging optics and the amount of pixels in the sensor array 32. The system parameter that describes the ratio between the smallest imaged space of the barcode 18 to the number of pixels at the sensor array 32 is pixels per module (PPM). The PPM being undesirably reduced by the cosine $\psi$ factor when the target object 18 plane is at a Field Angle $\psi$ other than normal to the optical axis (O/A).

Figure 5:
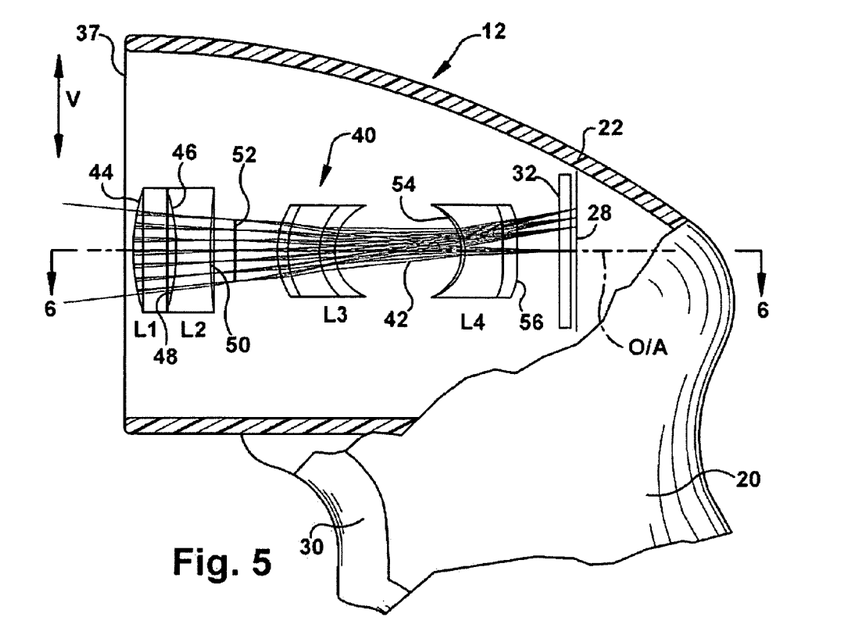
FIG. 5 is a partial-sectional-side view of a portable imaging reader imaging a target object having a lens configuration constructed in accordance with one example embodiment of the present disclosure.
Figure 6:
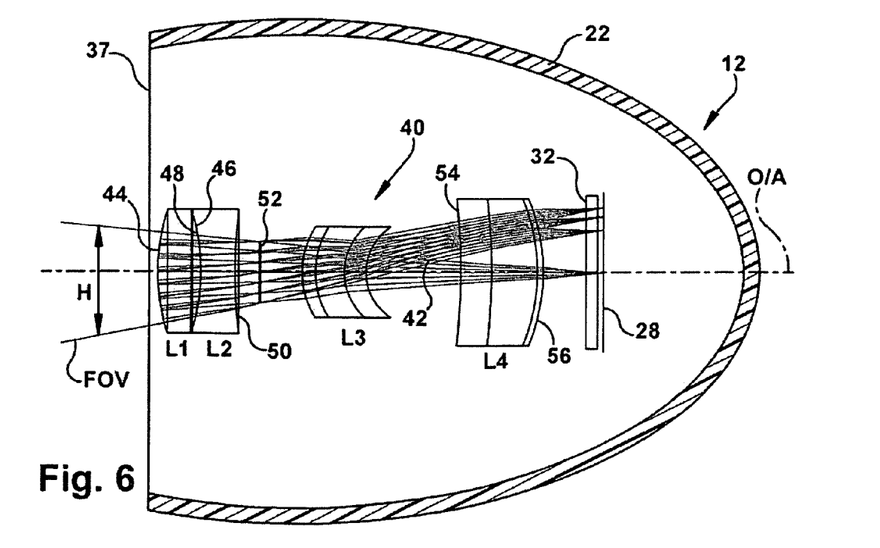
FIG. 6 is a partial-sectional-top view of the portable imaging reader imaging a target object having the lens configuration of the example embodiment constructed in FIG. 5.
Figure 7:
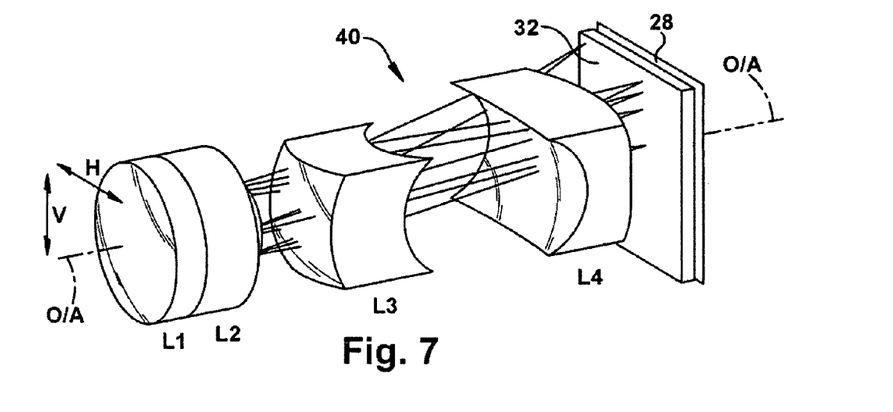
FIG. 7 is an isometric view of the lens configuration illustrated in the example embodiments constructed in FIGS. 5 and 6.

By constructing a lens assembly 40, illustrated in FIGS. 5-7 that delivers anamorphic magnification, the imaging reader's resolution improves for imaging in a preferred direction, overcoming the above problems, allowing imaging of high-density barcodes, bi-optic applications, and imaging object planes at a Field Angle $\psi$ from the optical axis (O/A) of the imaging readers 12, 14. In particular, the imaging lens with anamorphic magnification increases the PPM in a preferred direction to compensate for the reduction in PPM resulting from the Field Angle $\psi$, increasing the number of pixels used on the sensor array 32 to sample the barcode image.

One example embodiment of a lens assembly 40 having anamorphic magnification is shown in the sectional side and top views of a partially sectioned imaging reader 12 in FIGS. 5, and 6, respectively. The imaging system with anamorphic magnification overcomes the reduced resolution problems previously described by the increased magnification illustrated in Equation 2.

$$d' = d * \cos(\omega) * \text{magnification} \qquad \text{Equation (2)}$$

In one example embodiment, anamorphic magnification resulting from the lens assembly 40 is magnified along a preferred direction, increasing the overall resolution (utilized pixels) of the sensor array 32 and by these means improves the sampling rate of the projected image of the target object 18 by the sensor array. In another example embodiment, anamorphic magnification resulting from the lens assembly 40 provides magnification in a first direction along the sensor array 32 that is different from the magnification in a second direction along the sensor array. In yet another example embodiment, anamorphic magnification resulting from the lens assembly 40 forces the FOV to diverge slowly in a first direction and relatively faster in a second direction.

Figure 8:
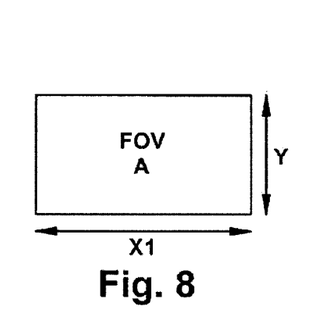
FIG. 8 is an illustrative example of a field-of-view of an optical system having symmetrical magnification.
Figure 9:
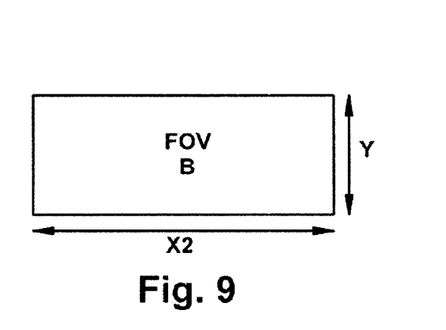
FIG. 9 is an illustrative example of a field-of-view of an optical system of one example embodiment constructed in accordance with the present disclosure having an asymmetrical magnification.

Referring now to FIG. 8 is an illustrative example of a field-of-view of an optical system having symmetrical magnification. More specifically, the field-of-view of the imaging reader (FOV A) has a sensor array with equal magnification along the X and Y axis, namely the magnification of X equals the magnification of Y. In the illustrated example, FOV A appears rectangular because a typical shape of the photosensitive array 32 is rectangular. The symmetrical magnification of FIG. 8 is contrasted with an asymmetrical anamorphic magnification on a sensor array 32 illustrated in FIG. 9, generated by the lens assembly 40 of one example embodiment of the present disclosure. In particular, the field-of-view (FOV B) of the imaging reader in FIG. 9 has an unequal magnification along the X and Y axis, or stated another way, Mag X2≠Mag Y. The FOV B of FIG. 9 will force the projected image of the target object 18 to appear stretched out along the X2 axis and/or compressed along the Y axis. The optical system comprising the lens assembly 40 with an asymmetrical anamorphic magnification of FIG. 9 improves the resolution or PPM of the sensor array 32 especially it will be helpful in cases where the object of interest 16 or target object 18 is imaged under a steep oblique angle or Field Angle.

Returning again to FIGS. 5-7, the lens assembly 40 is illustrated in accordance with one example embodiment of the present disclosure. While the lens assembly 40 is shown in a portable imaging reader 12 in FIGS. 5 and 6, it could also be adapted to a presentation-type imager 14 or any other scanner or imaging system without departing from the spirit and scope of the claimed invention. The lens assembly 40 in addition to delivering anamorphic magnification provides optical power for focusing the reflected image of the target object 18 onto the photosensitive array 32 (represented by the ray tracings in FIGS. 5-7).

In particular, the lens assembly of FIGS. 5-7 comprises of two major groups, the first one for providing the major optical power (base lens) (illustrated as L1 and L2) and the second group for modifying the magnification to anamorphic magnification (illustrated as L3 and L4). In a preferred embodiment, the four separate lens elements L1, L2, L3, and L4 provide a desired projected image 42 (represented by the ray tracings) of the target object 18 upon the sensor array 32. Lens elements L1 and L2 generate major optical power for the imaging system 10. The lens elements L1 and L2 in the example embodiment of FIGS. 5-7 are rotationally symmetrical wherein each optical surface is spherical. The lens elements L1 and L2 are fabricated from glass materials to provide thermal stability in the focal point relative to the sensor array 32 over a wide range of temperatures.

In an exemplary embodiment, the first lens element L1 is made from a crown glass material having a relatively high abbe value of approximately 46 or higher. The first lens element L1 provides positive optical power, constructed with spherical front 44 and back 46 surfaces. In an alternative embodiment, one of the front 44 or back 46 surfaces of lens element L1 is spherical while the other is a geometrically a flat surface. In combination with the exemplary embodiment of L1, the second lens element L2 is constructed from flint glass material having a relatively lower abbe value of approximately 30 or lower.

The second lens element L2 provides negative optical power, constructed with spherical front 48 and back 50 surfaces. The construct in this exemplary embodiment of lens elements L1 and L2 made from crown and flint glass facilitates minimizing chromatic aberration. In yet another example embodiment, any number of lenses can form the base lens in order to yield a desired imaging quality, without departing from the spirit and scope of the claimed invention. In the illustrated embodiment of FIGS. 5-7, base imaging lenses L1 and L2 are spherical lenses with substantially isotropic magnification (the magnification being substantially constant in all directions with no preferred direction) for projecting the image of the target object 18 on the sensor array 32. However, the base imaging lenses L1 and L2 could also be constructed from aspherical lenses as yet another alternative embodiment.

In the illustrated embodiment of FIGS. 5 and 6, an aperture stop 52 is located between the base lens group and the anamorphic magnification group, in particular between lens elements L2 and L3. Although the aperture stop 52 could equally be located between lens element L1 and L2. The aperture stop 52 is rotationally symmetrical (circular), however, it is equally capable of being rectangular or elliptical, the size and geometrical configuration of the aperture stop establishes the F number in both horizontal and vertical directions of the imaging system 10. In general, the F number in both the horizontal and vertical directions in the example embodiment are not equal. However, it have to be understood that by selecting a particular aperture size it is possible to yield an imaging system with anamorphic magnification and equal F number in both horizontal and vertical directions.

In another exemplary embodiment, the imaging system 10 is provided without base lens elements L1 and L2, and include only the anamorphic magnification lens elements, namely L3 and L4. In a further exemplary embodiment, the imaging system 10 is provided having the positioning of the base lens elements L1 and L2 between the anamorphic magnification lens elements L3 and L4 and sensor array 32.

Lens elements L3 and L4 of the illustrated embodiments of FIGS. 5-7 comprise aspherical toroidal lenses made from a crown plastic material. Suitable examples of a crown plastic material include Cyclo Olefin Polymer made under the trade name ZEONEX® manufactured by Zeon Chemicals L.P. of Louisville, Ky. or Cylic Olefin Copolymer (COC). Lens elements L3 and L4 are not rotationally symmetrical and have different optical powers along the horizontal (represented by arrows H in FIG. 6) and vertical (represented by arrows V in FIG. 5) directions. Lens element L4 has a substantially different optical power in the horizontal and vertical directions.

In one example embodiment, lens element L4 includes front 54 and back 56 surfaces in which the back surface facing the sensor array 32 is substantially aspherical, facilitating Field Angle or curvature compensation, thereby increasing the resolution (i.e. surface area utilized) on the sensor array. In the example embodiment, the optical power of L4 is positive along a horizontal direction (see arrows H in FIG. 6) and negative along a vertical direction (see arrows V in FIG. 5). Accordingly, the configuration of L4's optical power construct allows the FOV to be more elongated along the horizontal (H) direction relative to the vertical (V) direction as further illustrated in FIGS. 10 and 11.

Figure 10:
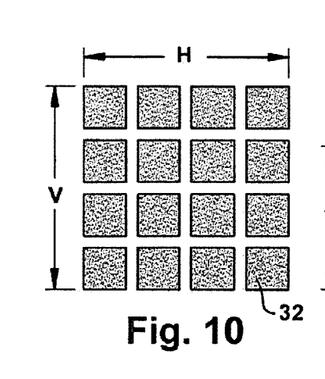
FIG. 10 is an illustrative example of an image received on a pixel grid projected over a sensor array of an optical system having symmetrical magnification.
Figure 11:
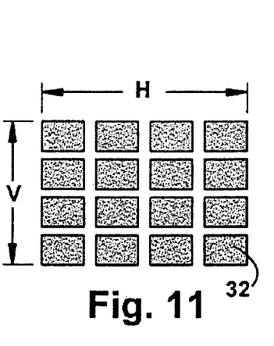
FIG. 11 is an illustrative example of an image received on a pixel grid projected over a sensor array of an optical system of one example embodiment constructed in accordance with the present disclosure having asymmetrical magnification.

FIG. 10 is an illustrative example of reflected image impinging on a pixel grid projected on a sensor array 32 using an optical system having symmetrical magnification. Applying the optical power of L4 to illustrated example of FIG. 10, changes the FOV pixel grid projection onto the sensor array 32 in that the optical power is positive along a horizontal (H) direction (see arrows H in FIG. 6) and negative along a vertical (V) direction (see arrows V in FIG. 5), resulting in an asymmetrical anamorphic magnification illustrated in FIG. 11. Stated another way, the images that would appear on a square pixel grid will appear rectangular once the FOV is modified by the lens assembly 40 of the imaging system 10.

Figure 12:
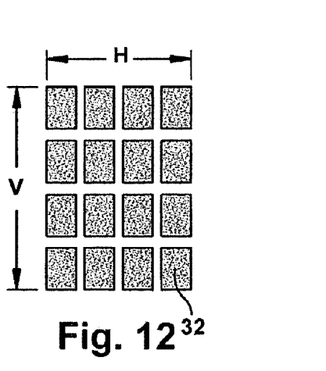
FIG. 12 is an illustrative example of an image received on a pixel grid projected over a sensor array of an optical system of another example embodiment constructed in accordance with the present disclosure having asymmetrical magnification.

The lens assembly 40 of FIGS. 5-7 can provide a difference in magnification along the horizontal (H) and vertical (V) directions, ranging approximately 1.5 to 3.0 times. In an alternative embodiment, the optical power of L4 is negative along a horizontal (H) direction and positive along a vertical (V) direction, resulting in an asymmetrical anamorphic magnification illustrated in FIG. 12.

The verity of Abbe value of plastic material is substantially small to compare with the Abbe values of glass. As a result, it is challenging to design an optical system with plastic optics that includes well-corrected chromatic aberrations. In yet another example embodiment, lens element L3 or L4 is made from a red plastic to filter red light only, therefore correcting the problem with inherited chromatic aberration do to green and blue light.

In one example embodiment, the selection of color of the plastic for lens element L3 or L4 is a function of the type of illumination source used by the imaging system 10. For example, if the wavelength of the illumination source is approximately 625 NM, then the color of the plastic for lens element L3 or L4 should be orange blocking the light with the wavelength shorter than approximately 625 NM.

In another example embodiment, a dielectric filter is positioned within the lens assembly 40 in order to filter out a desired wavelength. Alternatively, a multilayer dielectric coating can be applied to a protective cover glass over a sensor array 32 or a surface of one of the glass lenses, namely lens elements L1 or L2 in the lens assembly 40, which has a smaller curvature.

In general, imaging lenses of conventional imaging systems are typically rotationally symmetrical, making them easy to install during an assembly process. The non-rotationally symmetrical configuration of the example embodiment of L3 and L4 are not so easily assembled. Housing the lens elements L3 and L4 into keying features resolves uncertainty in lens alignment/position and facilitates ease of assembly, as illustrated in FIGS. 13-19.

Figure 13:
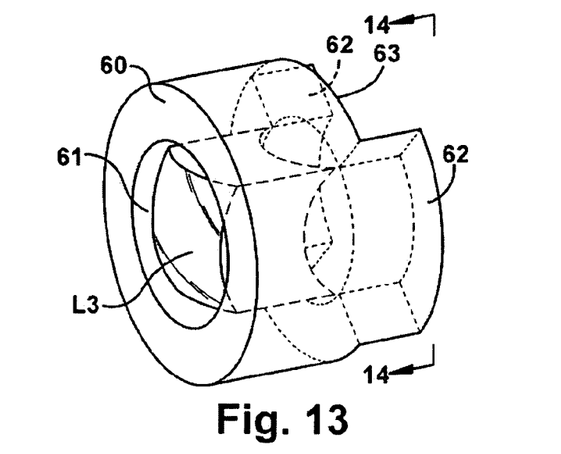
FIG. 13 is a perspective view of a first anamorphic lens in a first keying feature constructed in accordance with one embodiment of the present disclosure.
Figure 14:
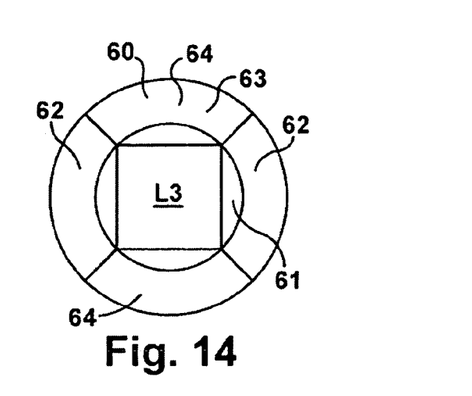
FIG. 14 is an end view of the first anamorphic lens in the first keying feature of FIG. 13.

FIG. 13 illustrates a perspective view of anamorphic lens element L3 in a first keying feature 60 constructed in accordance with one example embodiment of the present disclosure. The lens element L3 is located with a press-fit connection within the first lens surface 61 of the first keying feature 60. Bosses 62 protrude from a rear-side surface 63 (directed toward the sensor array 32 and opposite the target object 18 when assembled) of the first keying feature 60, as further illustrated in elevated end view of FIG. 14. Relief portions 64 are provided diametrically adjacent bosses 62.

Figure 15:
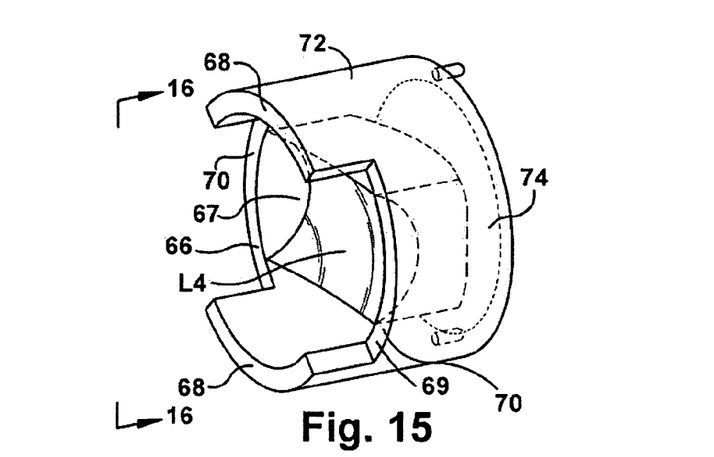
FIG. 15 is a perspective view of a second anamorphic lens in a second keying feature constructed in accordance with another embodiment of the present disclosure.
Figure 16:
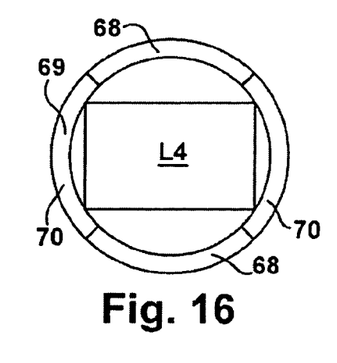
FIG. 16 is a first end view of the second anamorphic lens in the second keying feature of FIG. 15.
Figure 17:
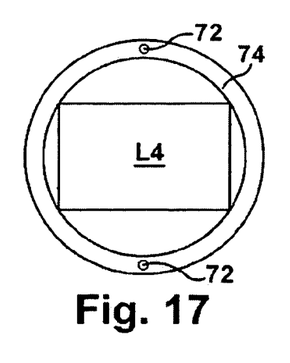
FIG. 17 is a second end view of the second anamorphic lens in the second keying feature of FIG. 15.

FIG. 15 illustrates a perspective view of an anamorphic lens element L4 in a second keying feature 66 constructed in accordance with one example embodiment of the present disclosure. The lens element L4 is located with a press-fit connection within a first lens surface 67 of the second keying feature 66. Bosses 68 protrude from a front-side surface 69 (directed opposite the sensor array 32 and toward the target object 18 when assembled) of the second keying feature 66, as further illustrated in an elevated first end view of FIG. 16. Relief portions 70 are provided diametrically adjacent bosses 68. FIG. 17 is an elevated second end view of FIG. 15 in which protrusions 72 extend from a rear surface 74 of the second keying feature 66.

Figure 18:
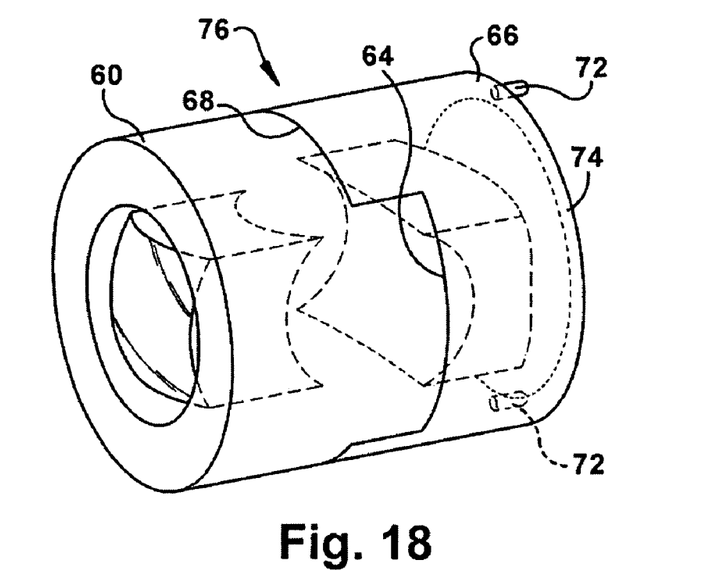
FIG. 18 is an assembly view of first and second keying features supporting first and second anamorphic lenses, respectively of FIGS. 13 and 15.

FIG. 18 illustrates a first assembly 76 comprising the first keying feature 60 securely located in second keying feature 66. The securely located orientation of the first assembly 76 is achieved by positioning the bosses 62 of the first keying feature 60 into corresponding relief portions 70 of the second keying feature 66. Similarly, the securely located orientation of the first assembly 76 is further achieved by positioning the bosses 68 of the second keying feature 66 into corresponding relief portions 64 of the first keying feature 60. The connection between corresponding bosses and relief portions, can be any form of connection, and in the illustrated embodiment of FIG. 18, the connection provides greater engagement than a conventional slip-fit connection.

Figure 19:
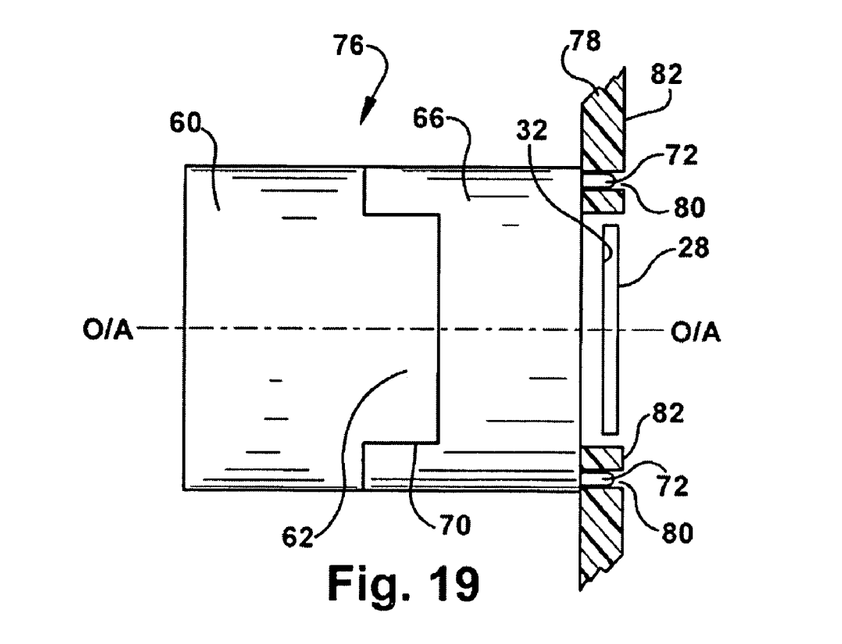
FIG. 19 is an assembly view of first and second keying features supporting first and second anamorphic lenses, respectively of FIGS. 13 and 15 oriented in guide apertures of a chassis of an imaging system relative to the location of a sensor array.

Once the two keying features 60, 66 are secured and L3 and L4 are properly oriented in the manner described above with respect to FIG. 18, the first assembly 76 can be positioned into a chassis 78 of a portable imaging reader 12 or bi-optic type imager 14 of an imaging system 10 as illustrated in FIG. 19. The chassis 78 includes corresponding openings 80 in its framework 82 for receiving protrusions 72 extending from the rear surface 74 of the second keying feature 66. The multiple protrusions 72 and respective openings 80 provide a secure connection as well self orienting feature for reassurance that proper alignment and orientation is achieved about the sensor array 32.

Figure 20:
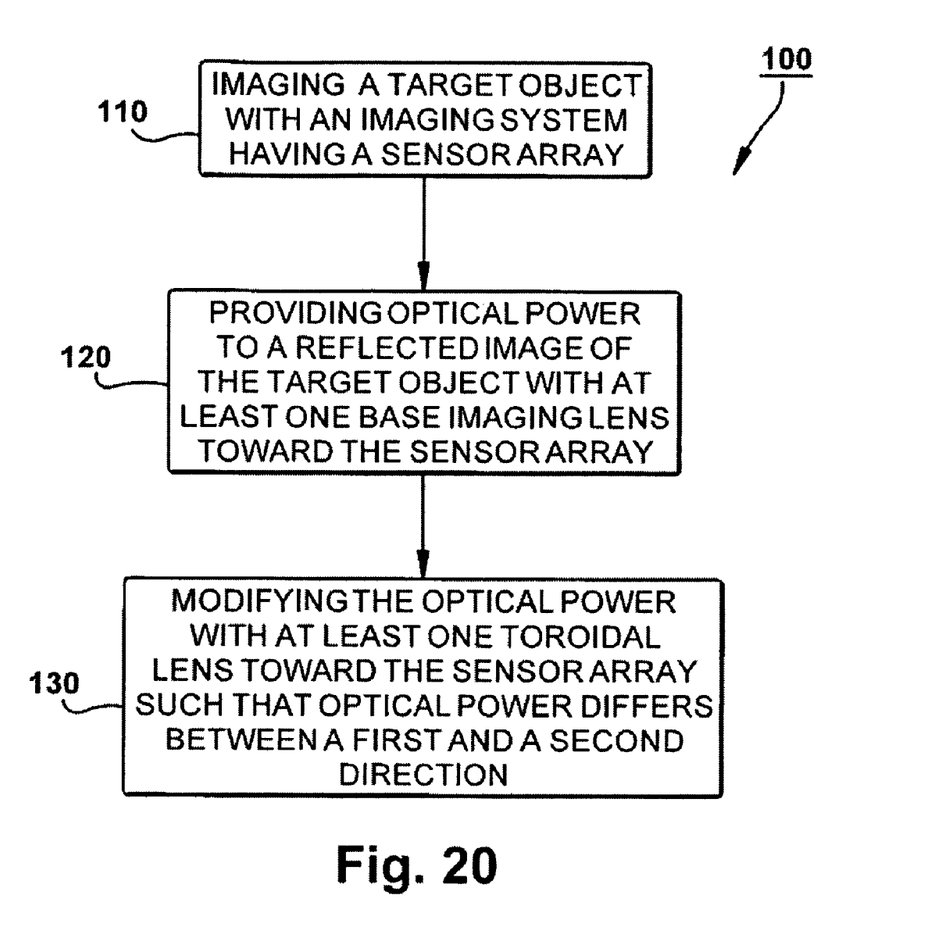
FIG. 20 is a block diagram illustrating an anamorphic magnification imaging process in accordance with one embodiment of the present disclosure.

Illustrated in FIG. 20 is a block diagram illustrating an anamorphic magnification imaging process 100 constructed in accordance with one embodiment of the present disclosure. At 110, a step of imaging a target object with an imaging system having a sensor array is initiated. At 120, optical power is provided to project a reflected image of the target object with at least one base imaging lens in a direction onto the sensor array. At 130, the optical power is modified with at least one toroidal lens toward the sensor array such that optical power differs between first and second directions.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A lens assembly adapted for reading a target object comprising:
    an anamorphic lens assembly comprising first and second toroidal lenses adapted for positioning between a target object and a sensor array of an imaging system such that an image received from said target object is anamorphically magnified before impinging onto the sensor array along first and second directions by the anamorphic lens assembly, the anamorphic magnification in the first direction differs from the magnification in said second direction such that the image of the target object projected onto the sensor array appears elongated along the first direction relative to said second direction.

2. The lens assembly of claim 1 wherein the anamorphic magnification difference between said first and second directions ranges between 1.5 and 3 times.

3. The lens assembly of claim 1 further comprising a base imaging lens assembly for providing optical power to project an image from a target object onto a sensor array of an imaging system, the anamorphic lens assembly being positioned between said base imaging lens assembly and said sensor array.

4. The lens assembly of claim 3 wherein said base imaging lens assembly comprises spherical first and second lenses, said spherical first lens provides positive optical power and is adapted for positioning between the target object and the spherical second lens and said spherical second lens provides negative optical power and is adapted for positioning between said spherical first lens and a sensor array of an imaging system.

5. The lens assembly of claim 4 wherein said spherical first lens is made from crown glass and said spherical second lens is made from flint glass.

6. The lens assembly of claim 4 further comprising a dielectric filter adapted to one of said spherical first and second lenses for filtering undesired wavelengths found in the reflected image passing through the lens assembly.

7. The lens assembly of claim 1 wherein said first and second toroidal lenses are aspherical and non-rotationally symmetrical.

8. The lens assembly of claim 1 wherein said first and second toroidal lens are made from a crown plastic material.

9. The lens assembly of claim 1 wherein one of said first and second toroidal lenses is made from colored plastic for filtering wavelengths of the reflected image passing through the lens assembly.

10. The lens assembly of claim 1 further comprising a first keying feature for supporting said first toroidal lens and a second keying feature for supporting said second toroidal lens, said first and second keying features rotationally symmetrical and adapted to be coupled for ease of assembly and alignment into an imaging system.

11. A method for enhancing the resolution of an image projected upon a sensor array in an imaging barcode reader comprising the steps of:
    providing a scanning arrangement comprising a sensor array for receiving an image reflected from a target object, an illumination source operable with the imaging barcode reader, and a decoding circuitry;
    producing optical power to project a reflected image from the target object with at least one base imaging lens assembly onto said sensor array;
    modifying the optical power from the base imaging lens assembly with an anamorphic magnification system so that the optical power along a first direction projected onto the sensor array differs from the optical power along a second direction projected onto the sensor array and
    decoding a barcode in an image modified by the anamorphic magnification system with the decoding circuitry.

12. The method of claim 11 wherein the anamorphic magnification difference between said first and second directions ranges between 1.5 and 3 times.

13. A method for enhancing the resolution of an image projected upon a sensor array in an imaging system comprising the steps of:

providing a scanning arrangement comprising a sensor array for receiving an image reflected from a target object;

producing optical power to project a reflected image from the target object with at least one base imaging lens assembly onto said sensor array;

modifying the optical power from the base imaging lens assembly with at least one toroidal lens toward the sensor array, the modifying the optical power comprising anamorphic magnification so that the optical power along a first direction projected onto the sensor array differs from the optical power along a second direction projected onto the sensor array; and producing positive optical power from a first lens of the base imaging lens assembly and producing negative optical power from a second lens of the base imaging lens assembly.

14. The method of claim 11 further comprising filtering undesired wavelengths passing through said at least one toroidal lens by forming the toroidal lens from a colored material.

15. A method for enhancing the resolution of an image projected upon a sensor array in an imaging barcode reader comprising the steps of:

providing a scanning means comprising a sensor array for impinging an image reflected from a target object, an illumination source operable with the imaging barcode reader, and a decoding circuitry;

producing optical power to project a reflected image from the target object with at least one base imaging lens assembly toward said sensor array;

modifying the optical power from the base imaging lens with at least one light transmitting means toward the sensor array, the modifying the optical power comprising anamorphic magnification from the light transmitting means so that the optical power along a first direction projected onto the sensor array differs from the optical power along a second direction projected onto the sensor array and decoding a barcode in an image modified by the anamorphic magnification with the decoding circuitry.

16. An imaging system for imaging and decoding a target object located on an object of interest comprising:

a scanning arrangement comprising a sensor array for receiving an image reflected from a target object and a lens assembly for modifying the projected image prior to its impingement upon the sensor array, the lens assembly comprising:

a base imaging lens assembly comprising first and second spherical lenses for providing optical power for projecting an image from a target object to said sensor array, the first spherical lens providing positive optical power for projecting the image and said second spherical lens providing negative optical power for projecting the image, the first spherical lens being positioned in the imaging system between the target object and said second spherical lens;

an anamorphic lens assembly comprising first and second toroidal lenses adapted for positioning between said second spherical lens and said sensor array of the imaging system such that the projected image received from said base imaging lens assembly is anamorphically magnified onto the sensor array along first and second directions, the anamorphic magnification in the first direction differs approximately 1.5 to 3.0 times from the anamorphic magnification in said second direction.

17. The imaging system of claim 16 wherein said imaging system is a hand-held scanner.

18. The imaging system of claim 16 wherein said imaging system is a presentation-type imager.

19. The imaging system of claim 16 wherein said first spherical lens is made from crown glass and said second spherical lens is made from flint glass.

20. The imaging system of claim 16 wherein said first and second toroidal lenses are aspherical and non-rotationally symmetrical.

21. The imaging system of claim 16 further comprising a first keying feature for supporting said first toroidal lens and a second keying feature for supporting said second toroidal lens, said first and second keying features rotationally symmetrical and adapted to be coupled for ease of assembly and alignment into an imaging system.

22. The imaging system of claim 21 further comprising a plurality of projections extending from said seconding keying feature having respective apertures in a chassis of, said imaging system for ease of assembly and alignment about a sensor located in said imaging system.

* * * * *